United States Patent Office

3,154,398
Patented Oct. 27, 1964

3,154,398
HERBICIDAL COMPOSITION AND METHOD
Dougal Harold McRae, Hatboro, Pa., assignor to Rohm & Haas Company, Philadelphia, Pa., a corporation of Delaware
No Drawing. Filed Aug. 31, 1961, Ser. No. 135,133
17 Claims. (Cl. 71—2.6)

This invention relates to herbicidal compositions. In particular, it concerns compositions comprising mixtures of 3',4'-dichloropropionanilide and 4-nitrodiphenyl ether derivatives as herein defined.

For as long as man has grown crops for food, shelter, clothing, and other human needs, he has found it necessary to remove undesirable plant growth from the environment of his crops; otherwise, these weeds detract too much from the soil moisture and nutrients needed by these crops and in other ways affect their proper growth. For most of this time weed control was largely an art and only in this century is it attaining the status of a science. The discovery by the plant physiologists and biochemists of the existence of auxins as vital plant growth regulating substances provided the stimulus for more concerted and scientific searches for new herbicides and plant growth regulating substances. As a consequence, for about the last twenty-five years, an increasing number of new herbicides and related materials have appeared annually. Herbicidal compounds so far discovered have been in the chemical classes of aliphatic, aromatic, and aryloxy acids and their simple derivatives such as salts and esters; various amides including ureas, carbamates, thiocarbamates, and anilides; various heterocyclic compounds, notably triazoles and triazines; phenolic compounds; and a miscellany of such structures as arsenicals, mercurials, organic phosphorus compounds, nitriles, and quaternaries.

On the other hand, it should be realized that with the hundreds of different crops that are grown under all types of climatic condiitons and in the various existing types of soils, there are all kinds of situations requiring control of undesirable vegetation and there is a real need for an almost endless variety of herbicides to apply to specific situations. It would now appear that the search for new herbicides will continue for as long as crops are grown.

An ideal herbicide would be one which gives full season selective weed control with a single application. It should be able to control all common weeds, killing them as the seed, the germinant seed, the seedling, or the established plant and at the same time it should not be phytocidal to selected crops. As with ideals in general, it could not be expected that such an ideal herbicide would be readily achieved, if ever. Certainly, today no herbicide exists which comes even close to these requirements. Major general improvements are needed, among others, in more selective control of undesirable plants among desirable crop plants, in more prolonged residual action, and in more economical herbicidal applications. Unexpectedly, we have found a way to approach these by admixing two types of herbicidal materials. The new and improved herbicidal properties of the resulting composition could not be predicted on the basis of the known properties of the individual components.

The preparation and herbicidal use of 3',4'-dichloropropionanilide have been described in application Serial No. 714,947, filed February 18, 1958, now abandoned. The reaction of 3,4-dichloroaniline with propionyl halides, propionic anhydride, or propionic acid produces 3',4'-dichloropropionanilide, a compound which is outstandingly effective as a selective weedicide. A formulation of 3',4'-dichloropropionanilide is available commercially under the trade name of STAM–F–34. This is used as a selective herbicide for weeds among cereal grains including rice, several solanaceous crops, some perennial legumes, corn, flax, turf, strawberries, sugar cane, pineapples, and other crops. Control of grassy weeds and a number of dicotyledonous weeds is obtained by application to the weeds shortly after their emergence. It has been found necessary to kill the weeds before they become woody. Over a growing season this may require repeated and sometimes frequent applications.

With most types of herbicides, it has been found difficult if not impossible to obtain full season control of weeds with a single application. Weed seeds do not all germinate at the same time, and depending on moisture content of the soil, competition from established crops, and other factors, there will always be new weeds appearing as germinating seedlings. It is recognized, therefore, that there is a real need to prolong herbicidal action and increase residual weed control, and in so doing the number of sprays needed per season would be reduced with a resultant economy. This need applies in general to N-3,4-dichlorophenyl or N-3-chloro-4-methylphenyl fatty acid amides. One achievement of this invention is a means of prolonging the action of herbicidal sprays containing chloroanilides, in particular 3',4'-dichloropropionanilide.

There are situations wherein it would be desirable to moderate the phytotoxicity of 3',4'-dichloropropionanilide to established economic crops and yet control weeds thereamong. In such situations, the difference between the dosage tolerated by the crop and that necessary to give adequate control of weeds in the crop is small. This margin of safety is, therefore, in rather fine balance and can be easily upset by minor changes in climate, soil, and other factors with the result of more injury to crops than is desirable. It is sought, therefore, to find herbicidal preparations wherein this margin of safety is improved; i.e., phytotoxicity to the crops is decreased while herbicidal action is increased. Improved crop tolerance is achieved by the compositions of this invention.

Improvements which have been above indicated as desirable are brought about through mixing 3',4'-dichloropropionanilide with at least one 4-nitrophenyl ether selected from the group consisting of 3-bromophenyl 4-nitrophenyl ether (A), 3-chlorophenyl 4-nitrophenyl ether (B), 3-ethylphenyl 4-nitrophenyl ether (C), 3-methylphenyl 4-nitrophenyl ether (D), 3-trifluoromethylphenyl 4 - nitrophenyl ether (E), 2,4 - dibromophenyl 4 - nitrophenyl ether (F), and 2,4-dichlorophenyl 4-nitrophenyl ether (G). Hereafter, these will be referred to as 4-nitrodiphenyl ethers.

The above compounds are identified by the capital letters for convenience in presenting data below.

Compounds of this type can be conveniently prepared by the standard method of reacting a phenol with p-nitrocholorobenzene in the presence of an alkali such as potassium hydroxide, for example, as described in U.S. Patent No. 2,134,556.

It may be noted that of the general classes of chemical structures which so far have attained commercial status as herbicides, nitro compounds are represented only by dinitrophenols and ethers only by aryloxy acids, and in this respect 4-nitrophenyl ether are unique.

The compositions of this invention comprise an admixture of 3',4'-dichloropropionanilide and at least one of the 4-nitrodiphenyl ethers as recited above in an agronomically acceptable carrier. By an agronomically acceptable carrier is meant any substance which can be used to dissolve, disperse, or diffuse the chemical within it without impairing the effectiveness of the toxic agent, which is not permanently deleterious to the soil in any chemical or physical manner, and which is usually non-phytocidal to the agronomic crops to be protected. The ratio of 3',4'-dichloropropionanilide to 4-nitrodiphenyl ether may be about 12:1 to 1:10; however, the preferred range of ratios is 3:1 to 1:3. The compositions may be in the form of emulsion concentrates, wettable powders, granular powders, or dusts.

An emulsion concentrate is made by dissolving 3',4'-dichloropropionanilide and the 4-nitrodiphenyl ether or mixture of 4-nitrodiphenyl ethers in a mutual solvent to which an emulsifier is added, as one type of surface active agent. Suitable solvents are found, for example, in the hydrocarbon, chlorinated hydrocarbon, ketone, ether, and ester classes of organic solvents, such as toluene, xylene, naphthas, ethylene dichloride, acetone, cyclohexanone, isophorone, dioxane, methyl oleate, and dimethyl phthalate, and mixtures of these. Preferred solvents are ketones or ketone-hydrocarbon mixtures. The specified solvents are inert with respect to the 3',4'-dichloropropionanilide, the 4-nitrodiphenyl ethers, and the emulsifying agent or agents.

Solvent-soluble emulsifiers useful for this purpose are surfactants of the anionic, cationic, or non-ionic types, either alone or in admixture. These include ethylene oxide derivatives of alkylphenols, or long-chained alcohols, mercaptans, carboxylic acids or reactive amines, such as octylphenoxypolyethoxyethanols having 8 to 100 ether groups; (higher alkyl) dimethylbenzylammonium chlorides; and various sulfates and sulfonates known to be surface-active agents, such as dodecyl sodium sulfate, octylphenoxyethoxyethyl sodium sulfonate, dodecylbenzenesulfonates, dioctyl sodium sulfosuccinate, and long-chained acyl taurates. Emulsion concentrates may be prepared to contain from about one to six pounds of 3',4'-dichloropropionanilide and about six to one pounds of the 4-nitrodiphenyl ether in a gallon.

The following compositions are typical for emulsion concentrate formulations.

| | Parts/100 parts total |
|---|---|
| 3',4' - dichloropropionanilide-4 - nitrodiphenyl ether mixture | 20 to 75 |
| Solvent | 23 to 78 |
| Emulsifying agent | 2 to 10 |

Wettable powder formulations comprise 3',4'-dichloropropionanilide and at least one 4-nitrodiphenyl ether as defined, admixed in a solid carrier along with surface-active agents which give this type of formulation its wettability, dispersability, and spreading characteristics. Solid carriers which are suitable for preparing these wettable powder formulations are those which have been rendered suitable by pulverizing devices and may be either organic or inorganic in nature. Suitable organic carriers are soybean, walnut, or wood flour or tobacco dust, and suitable inorganic ones are clays of the bentonite, kaolinite, or fuller's earth types; silicas such as diatomaceous earth; silicates such as talc, pyrophyllite, or alkaline earth silicates; and calcium and magnesium carbonates. The carrier may be a single substance or a mixture of finely divided solids. A surfactant or mixture of surfactants is added in an amount of 1 to 10 percent by weight of the wettable powder formulation. Suitable dispersing agents are sodium formaldehyde-naphthalene sulfonate, sodium lignin sulfonate, or sodium N-methyl-N-higher alkyl taurates. Wetting agents include higher alkylaryl sulfonates such as calcium dodecylbenzenesulfonate, long - chained alcohol sulfates, alkylphenoxyethoxyethyl sodium sulfonates, sodium dioctyl sulfosuccinate, and ethylene oxide adducts with fatty alcohols, fatty acids, long-chained mercaptans, or with higher alkylphenols, such as octylphenoxypolyethoxyethanol in which there are 8 to 100 ether groupings and similar polyethoxy compounds made from stearyl alcohol. Suitable sticking or spreading agents include glycerol mannitan laurate or a condensate of polyglycerol and oleic acid modified with phthalic anhydride. The active ingredient content of the wettable powder may be in the range of 20 to 80%; however, the preferred range of concentrations is 50% to 80%.

The following compositions are typical for wettable powder formulations:

| | Parts/100 parts total |
|---|---|
| Active ingredients | 20 to 80 |
| Carrier | 10 to 79 |
| Surfactant(s) | 1 to 10 |

Dust concentrates are made by incorporating the mixture of 3',4'-dichloropropionanilide and at least one 4-nitrodiphenyl ether into a solid carrier, such as finely powdered clays, talc, silica, and synthetic silicates, alkaline earth carbonates, and diluents of natural origin such as tobacco dust or walnut shell flour. Granular formulations are made from similar type solid carriers except that the particle size is larger, in the range of 15 to 60 mesh. A small amount of dispersing agent may be incorporated in these solid formulations. The concentration of active ingredients in these dust or granular formulations may be in the range of 2 to 15%.

One particularly convenient method for making solid formulations is to treat the solid carrier with the active ingredients dissolved in a volatile solvent, for example, acetone, and allow the solvent to evaporate off.

It will be seen from the above that the compositions of this invention may contain 10% to 98% of carrier based on the total weight of the composition, depending on whether it is in the form of an emulsion concentrate, a wettable powder, a dust, or a granular formulation.

Details of typical formulations are given in the following examples which are presented for purposes of illustration and not by way of limitation. Parts are by weight unless otherwise designated.

EXAMPLE 1

An emulsion concentrate of 3',4'-dichloropropionanilide was made by dissolving 25 parts of this anilide in a solution of 53 parts of xylene, 14 parts of isophorone, 2 parts of methanol, 3 parts of the octylphenoxypolyethoxyethanol containing 70 ethoxy groups, and 3 parts of calcium dodecylbenzenesulfonate. This gave a dark brown solution, one U.S. gallon of which weighed eight pounds and contained two pounds of the propionanilide. To one gallon of this solution was added one pound of 2,4-dichlorophenyl 4-nitrophenyl ether and the mixture stirred until complete solution resulted to give 1.1 gallons of an emulsion concentrate containing 3',4'-dichloropropionanilide and Compound G in the weight ratio of 2:1. To separate gallons of the 3',4'-dichloropropionanilide solution was added respectively one-quarter, one-half, and two pounds of Compound G, which resulted in solutions containing weight ratios of the propionanilide to the 4-nitrodiphenyl ether of 8:1, 4:1, and 1:1 respectively.

In like manner there may be made compositions in which 3',4'-dichloropropionanilide is mixed with 3-bromophenyl 4-nitrophenyl ether, 3-chlorophenyl 4-nitrophenyl ether, 3-ethylphenyl 4-nitrophenyl ether, 3-methylphenyl 4-nitrophenyl ether, 3-trifluoromethylphenyl 4-nitrophenyl ether, and 2,4-dibromophenyl 4-nitrophenyl ether. All of these compositions provide prolonged protection against weeds in selected crops.

EXAMPLE 2

To a solution of 3 parts of octylphenoxypolyethoxyethanol containing 70 ethoxy groups and 3 parts of calcium dodecylbenzenesulfonate in a mixture of 28 parts each of isophorone and xylene and 2 parts of methanol was added 36 parts of 3',4'-dichloropropionanilide. This gave an emulsion concentrate which contained three pounds of the propionanilide per gallon. To individual gallons of this solution was added respectively one-quarter, one-half, and two pounds of Compound G to produce combinations of 3',4'-dichloropropionanilide and 2,4-dichlorophenyl 4-nitrophenyl ether in the ratios of 12:1, 6:1, 3:1, and 1.5:1 respectively.

EXAMPLE 3

A 25% emulsion concentrate was made by dissolving 100 parts of Compound G in a solution of 10 parts of calcium dodecylbenzenesulfonate and nine parts of octylphenoxypolyethoxyethanol containing 20 ethoxy groups in a solvent consisting of 276 parts of xylene and five parts of a 25:75 mixture of an aromatic petroleum naphtha having a distillation range of 344 to 533° F. and methanol. This gave a light brown solution having a specific gravity of 0.970 at 25° C. To eight parts of this solution was added six parts of 3',4'-dichloropropionanilide, and the mixture was stirred to give an emulsion concentrate containing Compound G and 3',4'-dichloropropionanilide in the weight ratio of 1:3. Preparations are similarly formulated with Compounds A, B, C, D, E, and F by substituting them individually for Compound G in this example. Likewise, there may be used mixtures of these compounds in the above formulation. For example, a mixture of 20 to 80 parts of 2,4-dichlorophenyl 4-nitrophenyl ether and 80 to 20 parts of 3-methylphenyl 4-nitrophenyl ether is particularly advantageous.

EXAMPLE 4

*Part A.*—An emulsion concentrate was made by dissolving 45 parts of Compound D in 48 parts of xylene and then adding 7 parts of an emulsifier made from 38% by weight of octylphenoxypolyethoxyethanol containing 20 ethoxy groups, 42% of calcium dodecylbenzenesulfonate, 15% of methanol, and 5% of the same aromatic petroleum naphtha used above.

*Part B.*—An emulsion concentrate was made by dissolving 45 parts of 3',4'-dichloropropionanilide in 23 parts of isophorone and 17 parts of xylene and then adding 15 parts of an emulsifier made from 30% by weight of octylphenoxypolyethoxyethanol containing 70 ethoxy groups, 30% of calcium dodecylbenzenesulfonate, 20% of methanol, and 20% of xylene.

Parts A and B contain equal quantities of the two active ingredients, both being four pounds per gallon formulations; thus it is easy, by mixing Part A and Part B in any desired weight ratio to obtain compositions having any desired weight ratio of Compound D and 3',4'-dichloropropionanilide. For example, three gallons of Part A may be blended with one gallon of Part B to provide a 3:1 ratio of 4-nitrodiphenyl ether to 3',4'-dichloropropionanilide, or one gallon of Part A may be mixed with three gallons of Part B to provide a 1:3 ratio. Such compositions may be made at any time to give a single emulsion concentrate or may be formed in the spray tank just prior to the herbicidal application.

For Compound D in Part A of this example, there may be substituted any other 4-nitrodiphenyl ether defined in this invention.

EXAMPLE 5

A mixture of 25 parts of 3',4'-dichloropropionanilide, 12.5 parts of 2,4-dichlorophenyl 4-nitrophenyl ether, 12.5 parts of 3-chlorophenyl 4-nitrophenyl ether, 47 parts of natural kaolin and 3 parts of sodium formaldehyde-naphthalene sulfonate was ground in a ball mill for four hours, following which the blended mixture was micronized in an air attrition mill. The product, a light brown solid, containing 50% of active ingredients, was suitable for application as a dust.

There were mixed 95 parts of the above composition and 5 parts of a commercial product consisting of 40% of octylphenoxypolyethoxyethanol having 10 ether groups adsorbed on 60% of magnesium carbonate to give a wettable powder suitable for application from aqueous sprays.

In the same way, there was prepared a composition from 25 parts of 3',4'-dichloropropionanilide, 12.5 parts of 2,4-dichlorophenyl 4-nitrophenyl ether, 12.5 parts of 3-methylphenyl 4-nitrophenyl ether, 47 parts of kaolin, 3 parts of sodium formaldehyde-naphthalene sulfonate, and 5 parts of a mixture of 40% of octylphenoxypolyethanol of 10 ether groups adsorbed on 60% of magnesium carbonate.

The herbicidal composition of this invention may be applied broadcast to a growing area or to the environment of a growing crop or in a narrow band over a growing row crop or in a directed spray about a growing crop or in any other manner in which weed-controlling agents are applied. Generally, rates of application are from about one-half to twelve pounds of the active ingredients per acre, but the preferred range is one to five pounds per acre. Wettable powders and emulsion concentrates are applied as aqueous sprays; i.e., the concentrated formulations are mixed with water in a tank before spraying onto the area whereon weed control is desired. If the spraying machine is ground equipment, the usual carrier rate is 10 to 200 gallons, with a preferred range of 20 to 50 gallons per acre, whereas in aerial spray equipment the more usual carrier volume is 2 to 10 gallons per acre.

The practical herbicidal activity of the 4-nitrodiphenyl ethers was established by greenhouse tests involving typical monocotyledons (Monocots) and dicotyledons (Dicots) planted in 4" pots either as seeds (pre-emergence type tests) or as established plants (post-emergence type tests). The 4-nitrodiphenyl ether was dissolved in acetone, a nonionic emulsifying agent added, and the resulting composition was extended with water to spray strength. The 4-nitrodiphenyl ethers were then applied at the rate of five pounds per acre in duplicated tests to the pots of seeds or plants. Two weeks later the pots were evaluated for percent weed control. Table I gives the results.

*Table I*

HERBICIDAL ACTIVITY OF 4-NITRODIPHENYL ETHERS

| Composition | Percent Weed Control at 5 lbs./Acre | | | |
| --- | --- | --- | --- | --- |
| | Pre-Emergence Tests | | Post-Emergence Tests | |
| | Monocots | Dicots | Monocots | Dicots |
| A | 73 | 32 | 79 | 85 |
| B | 80 | 86 | 58 | 85 |
| C | 57 | 58 | 61 | 76 |
| D | 60 | 86 | 17 | 78 |
| E | 66 | 50 | 58 | 70 |
| F | 59 | 51 | 86 | 82 |
| G | 76 | 53 | 86 | 85 |

It can be seen that these 4-nitrophenyl ethers are quite generally phytotoxic to the seed or the emerging seedling or to the established plant for both grassy and broadleaf type plants. There are variations among the seven compounds with respect to specific crop or weed tolerances. In similar tests it was shown that a number of related diphenyl ethers, such as 2,4-dichlorophenyl 2-nitrophenyl ether, 2,4-dichlorophenyl 3-nitrophenyl ether, 4-nitrodiphenyl ether, 3,4'-dinitrodiphenyl ether, 3-methylphenyl 2-nitrophenyl ether, and 3-chlorophenyl 2-methoxy-4-nitrophenyl ether were almost completely inactive; that is, for all practical purposes all of the test plants were tolerant. This illustrates and emphasizes the non-predictability of herbicidal activity among the nitrodiphenyl ether class of organic compounds. There are a number of crops that are tolerant to the 4-nitrodiphenyl ethers of this invention as the seeds or emerging seedlings. Somewhat fewer, however, will tolerate post-emergence applications—some cereal grains are moderately tolerant; crops such as alfalfa, clover, and flax are temporarily injured but rapidly recover; and other crops such as corn, sorghum, sugar cane, and tomatoes are injured in the very young stage, but after they have become differentiated or woody will tolerate a directed spray. It is on these kinds of crops, therefore, that the compositions of this invention are used, and not on growing crops which are excessively injured by weed-controlling rates of the individual components.

A greenhouse test was conducted on the control of barnyard grass which is a major weed problem in rice fields throughout the world. Barnyard grass seed was planted in flats of soil by mixing the seed into the top inch of soil. This procedure was followed in order to obtain delayed emergence of some of the barnyard grass plants and to measure residual control of the barnyard grass. Twelve days after planting, the flats were treated with an aqueous spray made from a 25% emulsion concentrate of 3',4'-dicholoropropionanilide and of Compound G in the following amounts:

3',4' dichloropropionanilide alone at 2 and 3 lbs./acre, Compound G alone at 0.25, 0.5, and 1 lb./acre, and
3',4'-dichloropropionanilide at 2 lbs. plus G at 0.25 lb./acre
3',4'-dichloropropionanilide at 2 lbs. plus G at 0.5 lb./acre
3',4'-dichloropropionanilide at 2 lbs. plus G at 1 lb./acre
3',4'-dichloropropionanilide at 3 lbs. plus G at 0.25 lb./acre
3',4'-dichloropropionanilide at 3 lbs. plus G at 0.5 lb./acre
3',4'-dichloropropionanilide at 3 lbs. plus G at 1 lb./acre The percent control of barnyard grass was determined 13 days, 36 days, and 55 days following treatment. The data are given in Table I.

Table II

CONTROL OF BARNYARD GRASS WITH 3',4'-DICHLOROPROPIONANILIDE AND 2,4-DICHLOROPHENYL 4-NITROPHENYL ETHER ALONE AND IN COMBINATION

| Application Rate of Compound G (lb./Acre) | Percent Barnyard Grass Control— Application Rate of 3',4'-Dichloropropionanilide (lbs./Acre) | | |
|---|---|---|---|
| | 0 | 2 | 3 |

Part I.—Data taken 13 days following treatment

| | | | |
|---|---|---|---|
| 0 | 0 | 90 | 100 |
| 0.25 | 30 | 90 | 90 |
| 0.5 | 30 | 90 | 90 |
| 1.0 | 90 | 100 | 100 |

Part II.—Data taken 36 days following treatment

| | | | |
|---|---|---|---|
| 0 | 0 | 0 | 0 |
| 0.25 | 10 | 98 | 98 |
| 0.5 | 20 | 99 | 99 |
| 1.0 | 50 | 100 | 100 |

Part III.—Data taken 55 days following treatment

| | | | |
|---|---|---|---|
| 0 | 0 | 0 | 0 |
| 0.25 | 10 | 95 | 98 |
| 0.5 | 20 | 98 | 99 |
| 1.0 | 40 | 99 | 100 |

It will be seen that the results recorded 13 days after application measure the post-emergence activity of the preparations. It is with the subsequent evaluations that the advantages of the combination treatments are manifested. Subsequent to 13 days following treatment new barnyard grass plants germinated and the effect of the combined herbicides on the emerging seedlings are therefore measured by the data taken 36 and 55 days after application. It is seen that at these times 3',4'-dichloropropionanilide alone has no activity on barnyard grass and the 4-nitrodiphenyl ether gives essentially no control up to one-half pound dosages and even at one pound control is entirely inadequate. On the other hand, the combination of even two pounds of the propionanilide and one-quarter pound of Compound G is giving essentially complete control for about two months following treatment, and even longer.

The above data illustrate that one major advantage of the compositions of this invention is that the herbicidal action or weed control is extended over a long period of time, much longer than normally obtained with the individual components alone. The compositions of this invention will normally provide herbicidal control for the entire growing season of a crop with just one application, and thus the need for repeated spray applications is eliminated. Also hand weeding and hand cultivation are no longer necessary.

The herbicidal compositions of this invention have been particularly valuable where control of such weeds as barnyard grass, Bermuda grass, crabgrass, Johnson grass, orchard grass, rye grass, foxtail, millet, bindweed, carpet weed, curly dock, Indian mallow, lamb's-quarters, pigweeds, plantain, purslane, scarlet pimpernel, smartweed, and sorrel have been involved. It should be understood that specific weeds exhibit somewhat different specificity to compositions made containing different ones of the 4-nitrodiphenyl ethers of this invention. Consequently, combinations of different 4-nitrodiphenyl ethers with 3',4'-dichloropropionanilide may be specifically chosen for any given weed problem.

Another greenhouse test was conducted on Blue Bonnet and Century Patna varieties of rice planted in greenhouse flats. Treatments were made 12 days after planting with 3',4'-dichloropropionanilide at two and three pounds per acre, with Compound G at one-quarter, one-half, and one pound per acre, and with all of the possible combinations of these two herbicides of the above given dosages. Thirteen days after treatment, the injury to the rice plants was rated on a 0 to 10 scale with 0 equal to no injury, 10 equal to complete kill and intermediate values representing proportional degrees of burn type injury and inhibition of growth of the rice plants. Table III gives the results.

Table III

PHYTOTOXICITY OF 3'4'-DICHLOROPROPIONANILIDE AND 2,4-DICHLOROPHENYL 4-NITROPHENYL ETHER ALONE AND IN COMBINATION ON RICE

| Rice Variety | Application rate of Compound G (lbs./acre) | Injury Rating—Application rate of 3',4'-dichloropropionanilide (lbs./acre) | | |
|---|---|---|---|---|
| | | 0 | 2 | 3 |
| Blue Bonnet | 0 | 0 | 0 | 0 |
| | 0.25 | 0.5 | 0 | 0 |
| | 0.5 | 2.5 | 0 | 0.5 |
| | 1.0 | 3.5 | 0.5 | 1.0 |
| Century Patna | 0 | 0 | 0 | 0 |
| | 0.25 | 0.5 | 0 | 0 |
| | 0.5 | 2.0 | 0 | 0 |
| | 1.0 | 3.0 | 0 | 0.5 |

At the one-pound level Compound G alone was found to injure moderately both varieties of rice by burning and temporarily inhibiting growth. When this quantity of Compound G was combined with two or three pounds of 3',4'-dichloropropionanilide, the amount of injury was reduced to none or very slight. Similar results were obtained with Compound G and its combinations at the one-half pound level. This reduction in phytotoxicity is entirely unpredictable.

By means of the compositions of this invention and for the first time, it is possible to apply at weed controlling rates herbicidally active 4-nitrodiphenyl ethers on crops which are moderately susceptible to them and leave the crops essentially uninjured.

For control of barnyard grass in rice under usual conditions it is desirable to use compositions providing two to four pounds of 3',4'-dichloropropionanilide with one-half to two pounds of an effective 4-nitrodiphenyl ether per acre. The preferred rates of application are two to three pounds of 3',4'-dichloropropionanilide together with one to two pounds of a 4-nitrodiphenyl ether per acre.

The test data establish that the need is met for herbicides which exhibit high activity against weeds at low rates of application, which have improved tolerance to crops, and which have prolonged activity, thus avoiding the necessity for frequent applications. Another advantage of the herbicidal compositions of this invention is that it is possible to use the mixtures of 3',4'-dichloropropionanilide with a 4-nitrodiphenyl ether on crops on which the latter could not be used alone. It is possible to use these mixtures on such valuable and varied crops as cereal grains, perennial legumes, solanaceous crops, corn, flax, and sugar cane and to take advantage of the herbicidal properties of the active 4-nitrodiphenyl ethers without the severe damage which frequently is observed when the ethers are used alone.

When 3',4'-dichloropropionanilide is used alone as a herbicide, it exhibits excellent initial weed control in those crops tolerant to it, but in many instances since it lacks persistency, reapplications at short intervals, as little as three weeks, have been necessary. Naturally, for economic reasons, the fewer the number of herbicidal treatments needed, the better. Also, there are such situations as in grain and potato fields, where the plant growth habits or method of planting make it impossible at advanced stages of growth to get ground equipment into the fields to apply herbicides or to remove the weeds. The herbicidal compositions of this invention are particularly useful in that practical weed control is obtained at early stages of growth and persists for the entire growing season. This outcome in highly advantageous.

I claim:

1. A herbicidal composition comprising an admixture of 3',4'-dichloropropionanilide and at least one 4-nitrodiphenyl ether selected from the group consisting of
   3-bromophenyl 4-nitrophenyl ether,
   3-chlorophenyl 4-nitrophenyl ether,
   3-ethylphenyl 4-nitrophenyl ether,
   3-methylphenyl 4-nitrophenyl ether,
   3-trifluoromethylphenyl 4-nitrophenyl ether,
   2,4-dibromophenyl 4-nitrophenyl ether, and
   2,4-dichlorophenyl 4-nitrophenyl ether,
said 3',4'-dichloropropionanilide and said 4-nitrodiphenyl ether being present in said composition in amounts and proportions sufficient to provide in the presence of each other control of growth of weeds.

2. Compositions according to claim 1 wherein the weight ratio of 3',4'-dichloropropionanilide to 4-nitrodiphenyl ether is 12:1 to 1:10.

3. A herbicidal composition comprising an admixture of 3',4'-dichloropropionanilide and at least one 4-nitrodiphenyl ether selected from the group consisting of
   3-bromophenyl 4-nitrophenyl ether,
   3-chlorophenyl 4-nitrophenyl ether,
   3-ethylphenyl 4-nitrophenyl ether,
   3-methylphenyl 4-nitrophenyl ether,
   3-trifluoromethylphenyl 4-nitrophenyl ether,
   2,4-dibromophenyl 4-nitrophenyl ether, and
   2,4-dichlorophenyl 4-nitrophenyl ether,
wherein the weight ratio of 3',4'-dichloropropionanilide to 4-nitrodiphenyl ether is 12:1 to 1:10, said 3',4'-dichloropropionanilide and 4-nitrodiphenyl ether being dispersed in an agronomically acceptable carrier.

4. A herbicidal composition comprising an admixture of 3',4'-dichloropropionanilide and at least one 4-nitrodiphenyl ether selected from the group consisting of
   3-bromophenyl 4-nitrophenyl ether,
   3-chlorophenyl 4-nitrophenyl ether,
   3-ethylphenyl 4-nitrophenyl ether,
   3-methylphenyl 4-nitrophenyl ether,
   3-trifluoromethylphenyl 4-nitrophenyl ether,
   2,4-dibromophenyl 4-nitrophenyl ether, and
   2,4-dichlorophenyl 4-nitrophenyl ether
together with an agronomically acceptable carrier and a surface active agent, wherein the weight ratio of 3',4'-dichloropropionanilide to 4-nitrodiphenyl ether is 12:1 to 1:10.

5. Compositions according to claim 4 in which the carrier is an inert organic solvent and the surface active agent is a solvent-soluble emulsifying agent.

6. A herbicidal composition comprising an admixture of 3',4'-dichloropropionanilide and at least one 4-nitrodiphenyl ether selected from the group consisting of
   3-bromophenyl 4-nitrophenyl ether,
   3-chlorophenyl 4-nitrophenyl ether,
   3-ethylphenyl 4-nitrophenyl ether,
   3-methylphenyl 4-nitrophenyl ether,
   3-trifluoromethylphenyl 4-nitrophenyl ether,
   2,4-dibromophenyl, 4-nitrophenyl ether, and
   2,4-dichlorophenyl 4-nitrophenyl ether
together with an inert organic solvent and a solvent-soluble emulsifying agent, wherein the weight ratio of 3',4'-dichloropropionanilide to said 4-nitrodiphenyl ether is 3:1 to 1:3.

7. A herbicidal composition comprising an admixture of 3',4'-dichloropropionanilide and 2,4-dichlorophenyl 4-nitrophenyl ether in a weight ratio of 12:1 to 1:10 together with an agronomically acceptable carrier.

8. A herbicidal composition comprising an admixture of 3',4'-dichloropropionanilide and 3-methylphenyl 4-nitrophenyl ether in a weight ratio of 12:1 to 1:10 together with an agronomically acceptable carrier.

9. A herbicidal composition comprising an admixture of 3',4'-dichloropropionanilide, 3-methylphenyl 4-nitrophenyl ether, and 2,4-dichlorophenyl 4-nitrophenyl ether wherein the weight ratio of 3',4'-dichloropropionanilide to the said 4-nitrophenyl ethers is 12:1 to 1:10 together with an agronomically acceptable carrier.

10. A method of controlling weeds which comprises applying to weeds before they become woody an amount sufficient to control the growth of said weeds of a herbicidal composition comprising a mixture of (1) 3',4'-dichloropropionanilide and (2) at least one 4-nitrodiphenyl ether selected from the group consisting of
   3-bromophenyl 4-nitrophenyl ether,
   3-chlorophenyl 4-nitrophenyl ether,
   3-ethylphenyl 4-nitrophenyl ether,
   3-methylphenyl 4-nitrophenyl ether,
   3-trifluoromethylphenyl 4-nitrophenyl ether,
   2,4-dibromophenyl 4-nitrophenyl ether, and
   2,4-dichlorophenyl 4-nitrophenyl ether,
said 3',4'-dichloropropionanilide and said 4-nitrodiphenyl ether being present in said composition in amounts and proportions sufficient to provide in the presence of each other control of growth of weeds.

11. A method of controlling weeds which comprises applying to weeds in a tender stage of growth an amount sufficient to control the growth of said weeds of a herbicidal composition comprising a mixture of (1) 3',4'-dichloropropionanilide and (2) at least one 4-nitrodiphenyl ether selected from the group consisting of
   3-bromophenyl 4-nitrophenyl ether,
   3-chlorophenyl 4-nitrophenyl ether,
   3-ethylphenyl 4-nitrophenyl ether,
   3-methylphenyl 4-nitrophenyl ether,
   3-trifluoromethylphenyl 4-nitrophenyl ether,
   2,4-dibromophenyl 4-nitrophenyl ether, and
   2,4-dichlorophenyl 4-nitrophenyl ether,
wherein the weight ratio of 3',4'-dichloropropionanilide to said 4-nitrophenyl ether is 12:1 to 1:10.

12. A method of controlling weeds which comprises applying to weed seedlings a growth-controlling amount of a herbicidal composition comprising a mixture of (1) 3',4'-dichloropropionanilide and (2) at least one 4-nitrodiphenyl ether, selected from the group consisting of
   3-bromophenyl 4-nitrophenyl ether,
   3-chlorophenyl 4-nitrophenyl ether,
   3-ethylphenyl 4-nitrophenyl ether,
   3-methylphenyl 4-nitrophenyl ether,
   3-trifluoromethylphenyl 4-nitrophenyl ether,
   2,4-dibromophenyl 4-nitrophenyl ether, and
   2,4-dichlorophenyl 4-nitrophenyl ether,
wherein the weight ratio of 3',4'-dichloropropionanilide to said 4-nitrodiphenyl ether is 12:1 to 1:10, said 3',4'-dichloropropionanilide and said 4-nitrodiphenyl ether being dispersed in an agronomically acceptable carrier, and said composition being applied at a rate between one-half and twelce pounds per acre of admixture of said 3',4-dichloropropionanilide and said 4-nitrodiphenyl ether.

13. A method of controlling weeds which comprises applying to weed seedlings an aqueous spray carrying a mixture of 3',4'-dichloropropionanilide and at least one 4-nitrodiphenyl ether selected from the group consisting of 3-bromophenyl 4-nitrophenyl ether,
3-chlorophenyl 4-nitrophenyl ether,
3-ethylphenyl 4-nitrophenyl ether,
3-methylphenyl 4-nitrophenyl ether,
3-trifluoromethylphenyl 4-nitrophenyl ether,
2,4-dibromophenyl 4-nitrophenyl ether, and
2,4-dichlorophenyl 4-nitrophenyl ether, said mixture being dissolved in an inert organic solvent together with a solvent-soluble emulsifying agent, wherein the weight ratio of 3',4'-dichloropropionanilide to said 4-nitrodiphenyl ether is 12:1 to 1:10, at a rate of one-half to twelve pounds per acre of admixture of 3',4'-dichloropropionanilide and said 4-nitrodiphenyl ether.

14. A method of controlling weeds which comprises applying to weed seedlings an aqueous spray carrying a mixture of (1) 3',4'-dichloropropionanilide, (2) at least one 4-nitrodiphenyl ether selected from the group consisting of 3-bromophenyl 4-nitrophenyl ether,
3-chlorophenyl 4-nitrophenyl ether,
3-ethylphenyl 4-nitrophenyl ether,
3-methylphenyl 4-nitrophenyl ether,
3-trifluoromethylphenyl 4-nitrophenyl ether,
2,4-dibromophenyl 4-nitrophenyl ether, and
2,4-dichlorophenyl 4-nitrophenyl ether, and (3) a finely divided solid carrier together with a surfactant, the weight ratio of 3',4'-dichloropropionanilide to said 4-nitrodiphenyl ether being 12:1 to 1:10, the rate of application being one-half to twelve pounds per acre of admixture of 3',4'-dichloropropionanilide and said 4-nitrodiphenyl ether.

15. A method of controlling weeds which comprises applying to weeds before they become woody a mixture containing (1) 3',4'-dichloropropionanilide, (2) 2,4-dichlorophenyl 4-nitrophenyl ether, and (3) an agronomically acceptable carrier therefor, the weight ratio of 3',4'-dichloropropionanilide to 2,4-dichlorophenyl 4-nitrophenyl ether being 12:1 to 1:10, the rate of application per acre being one-half to twelve pounds of the combined weights of 3',4'-dichloropropionanilide and 2,4-dichlorophenyl 4-nitrophenyl ether.

16. A method of controlling weeds which comprises applying to weeds before they become woody a mixture containing (1) 3',4'-dichloropropionanilide, (2) 3-methylphenyl 4-nitrophenyl ether, and (3) an agronomically acceptable carrier therefor, the weight ratio of 3',4'-dichloropropionanilide to 3-methylphenyl 4-nitrophenyl ether being 12:1 to 1:10, the rate of application per acre being one-half to twelve pounds of the combined weights of 3',4'-dichloropropionanilide and 3-methylphenyl 4-nitrophenyl ether.

17. A method of controlling weeds which comprises applying to weeds before they become woody a mixture containing (1) 3',4'-dichloropropionanilide, (2) 2,4-dichlorophenyl 4-nitrophenyl ether, (3) 3-methylphenyl 4-nitrophenyl ether, and (4) an agronomically acceptable carrier therefor, the ratio of 3',4'-dichloropropionanilide to the said 4-nitrophenyl ethers being 12:1 to 1:10, the rate of application per acre being one-half to twelve pounds of the combined weights of 3',4'-dichloropropionanilide and the said 4-nitrophenyl ethers.

References Cited in the file of this patent

UNITED STATES PATENTS 2,726,946    Mussell _____ Dec. 13, 1955

FOREIGN PATENTS 1,039,779    Germany _____ Sept. 25, 1958